United States Patent [19]

Gibbons

[11] Patent Number: 4,607,324

[45] Date of Patent: Aug. 19, 1986

[54] REDUCED HARMONIC CURRENT RECTIFIER INCLUDING SEQUENTIALLY SWITCHED SECONDARY WINDINGS

[76] Inventor: William P. Gibbons, 6520 Larcomb Dr., Huber Heights, Ohio 45424

[21] Appl. No.: 581,400

[22] Filed: Feb. 17, 1984

[51] Int. Cl.$^4$ .......................................... H02M 7/525
[52] U.S. Cl. ........................................ 363/128; 320/1; 363/46
[58] Field of Search ................. 363/44, 45, 46, 85, 363/86, 88, 126, 127, 128, 59; 320/1; 307/246, 252 M, 82, 109

[56] References Cited

U.S. PATENT DOCUMENTS

| | | | |
|---|---|---|---|
| 3,195,038 | 7/1965 | Fry | 323/25 |
| 3,504,265 | 3/1970 | Toulemonde | 321/5 |
| 3,521,145 | 7/1970 | Toulemonde et al. | 363/128 |
| 3,654,537 | 4/1972 | Coffey | 320/1 |
| 3,821,635 | 6/1974 | Kimmel et al. | 320/1 |
| 4,021,721 | 5/1977 | Tachibana | 363/128 |
| 4,051,425 | 9/1977 | Smith | 363/86 |
| 4,102,298 | 7/1978 | Dietze et al. | 118/5 |
| 4,179,728 | 12/1979 | Pirkle | 363/59 |
| 4,340,931 | 7/1982 | Endo et al. | 363/126 |
| 4,449,176 | 5/1984 | Turnbull | 363/126 |

OTHER PUBLICATIONS

Gibbons, W. P., "Analysis of Steady-State Transients in Distributed Low Power Systems with Rectified Loads", IEEE Trans. on Industrial Applications, vol. 1A-16, No. 1, Jan.-Feb. 1980, pp. 51-59.

*Primary Examiner*—Patrick R. Salce
*Assistant Examiner*—D. Rebsch
*Attorney, Agent, or Firm*—Killworth, Gottman, Hagan & Schaeff

[57] ABSTRACT

A rectifier circuit for receiving an A.C. electrical power signal at a pair of circuit input terminals and for providing a rectified, D.C. electrical power signal at a pair of circuit output terminals includes a primary transformer winding connected to receive the A.C. electrical power signal, a plurality of secondary transformer windings, and a semi-conductor rectifying and switching circuit which supplies a D.C. electrical power signal to a storage capacitor connected across the circuit output terminals. A control circuit sequentially actuates the semi-conductor switches such that differing combinations of the secondary transformer windings are sequentially connected across the storage capacitor during each successive half cycle of the A.C. electrical power signal. By this arrangement, the charging current supplied to the capacitor and the charging potential across the capacitor fluctuate minimally during most of each half cycle and the A.C. electrical power signal is not substantially distorted in waveshape.

10 Claims, 7 Drawing Figures

FIG-2
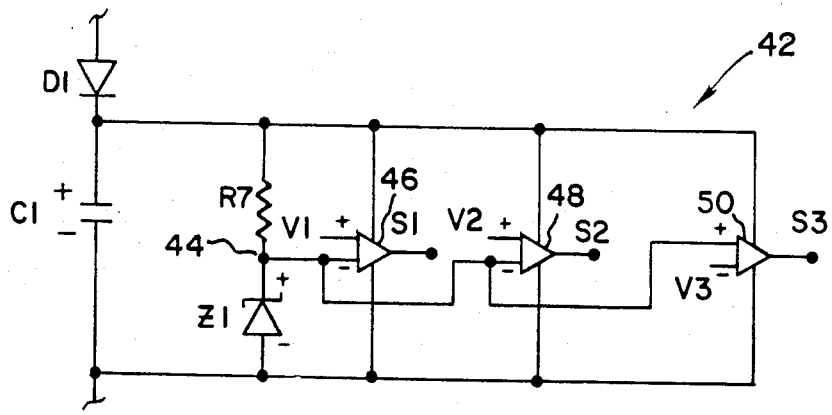
FIG-5
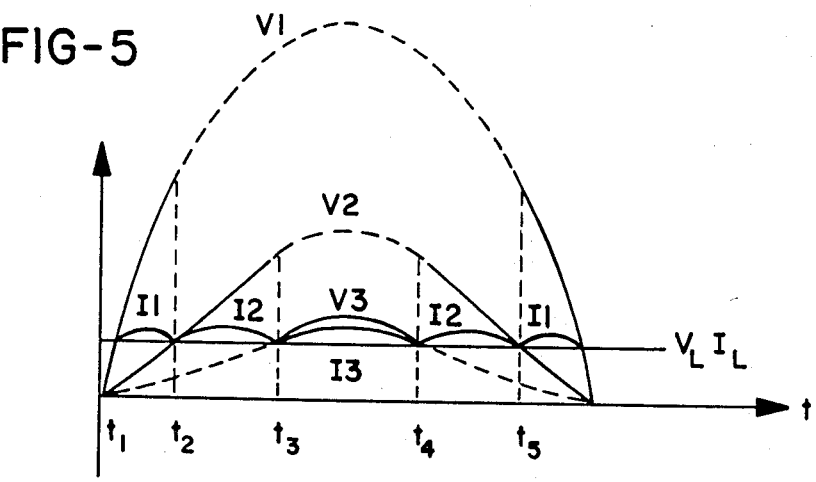
FIG-6A
FIG-6B
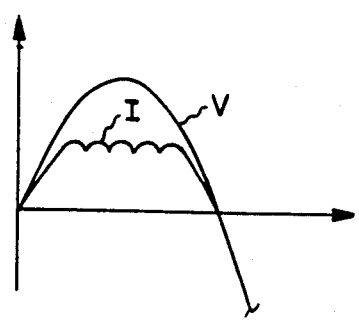

(4,607,324)

REDUCED HARMONIC CURRENT RECTIFIER INCLUDING SEQUENTIALLY SWITCHED SECONDARY WINDINGS

BACKGROUND OF THE INVENTION

The present invention relates to a rectifier circuit and, more particularly, to a circuit for converting an A.C. electrical power signal to a D.C. electrical power signal, in which the waveshape of the A.C. power signal is not distorted by the rectification process.

Rectifier circuits which provide a source of D.C. electrical power are known in which a transformer has its primary winding connected to an A.C. electrical power signal source and a secondary winding connected in series with a diode and a storage capacity. In this arrangement, the diode is forward biased during alternate half cycles so as to charge the capacitor to the potential of the secondary winding. If desired, additional diodes may be connected in a full-wave rectifier bridge so as to apply a charging potential to the capacitor during both positive and negative half cycles of the A.C. signal. Rectified D.C. power is available across the capacitor, which provides a smoothing action.

It will be appreciated that the capacitor will receive charging currents only when the series connected diode is forward biased. During steady state operation, the A.C. voltage induced in the secondary winding will exceed the potential across the capacitor, and thereby forward bias the diode, only during a relatively short interval of each half cycle. As a consequence, the charging current to the capacitor will be of very short duration. This current spike in the secondary of the transformer produces a corresponding current spike in the primary winding, thus producing irregularities in the voltage waveform of the A.C. electrical power signal. This waveform distortion can have an adverse effect on the operation of other circuits connected to the same A.C. electrical power distribution system.

Further problems may occur where a number of single phase rectifiers are connected in a number of the phases of a multi-phase power system. The distorted voltage and current waveshapes have been found to produce a substantial net current flow through the neutral conductor of the power system. The currents produced by the separate phases of the system, rather than cancelling in the neutral conductor as would normally be the case, can instead add together to produce a neutral current flow which is in excess of the rated current-handling capabilities of the neutral conductor. Further, this current through the neutral conductor is at a frequency equal to three times the frequency of the A.C. power signal. This high frequency current increases the heat loss produced in the transformer core of the polyphase transformer of the power system.

It is seen, therefore, that a need exists for a rectifier device for converting an A.C. power signal into a D.C. power signal in which minimal waveshape distortion of the A.C. power signal is produced.

SUMMARY OF THE INVENTION

A rectifier circuit for receiving an A.C. electrical power signal at a pair of circuit input terminals and for providing a rectified, D.C. electrical power signal at a pair of circuit output terminals includes a primary transformer winding connected to receive the A.C. electrical power signal and a plurality of secondary transformer windings. The rectifier circuit further includes switch means for connecting a single secondary transformer winding or the serial combination of two or more of the secondary transformer windings across the output terminals. The switch means includes rectifier means to insure a unipolar, D.C. electrical power signal across the output terminals. The rectifier circuit further includes storage capacitor means connected across the output terminals, and control means for sequentially actuating the switch means such that a single secondary transformer winding and serial combinations of the plurality of secondary transformer windings are sequentially connected across the output terminals during each successive half cycle of the A.C. electrical power signal. By this arrangement, the duration of the charging current supplied to the capacitor means during a half cycle of the A.C. electrical power signal is lengthened while limiting the amplitude of the charging current, and the A.C. electrical power signal is not substantially distorted in waveshape.

The rectifier circuit may further include reference potential means for providing a reference potential level, and a plurality of comparator means for comparing the reference potential level to the potential levels across the single secondary winding and the series combinations of the plurality of secondary windings, and for actuating the switch means such that the secondary transformer winding or series combination of windings having the lowest potential thereacross in excess of a reference level is connected across the output terminals.

The reference potential level may be set such that a generally constant charging current flows to the capacitor during most of each half cycle of the A.C. electrical power signal, whereby the current flow and potential fluctuation in the primary transformer winding are undistorted.

The switch means may further comprise a plurality of power MOSFET devices. The rectifier means may include full wave rectifier means for applying the unipolar D.C. electrical power signal across the output terminals during each half cycle of the A.C. electrical power signal.

Accordingly, it is an object of the present invention to provide a rectifier circuit for converting an A.C. electrical power signal to a rectified, D.C. electrical power signal including a storage capacitor means across the rectifier circuit output terminals, in which charging current flows to the capacitor during a substantial portion of at least every other half cycle of the A.C. electrical power signal so that the waveshape of the A.C. electrical power signal is not distorted substantially; to provide such a rectifier circuit in which a transformer having multiple secondary transformer windings is connected for charging the storage capacitor means; and to provide such a circuit in which various combinations of the secondary transformer windings are serially connected during a half cycle of the A.C. electrical power signal to lengthen the duration of the charging current to the capacitor during a half cycle, while limiting the amplitude of the charging current.

Other objects and advantages of the invention will be apparent from the following description, the accompanying drawings and the appended claims.

BRIEF DESCRIPTION OF THE DRAWINGS

FIG. 2 is an example of a control circuit which may be used in the circuit of FIG. 1;

FIG. 5 illustrates the waveshapes of the charging voltage and current supplied to the output capacitor of the rectifier circuit of FIG. 1; and FIG. 6a and FIG. 6b illustrate the effect of a change from a heavy loading of the rectifier circuit to a light loading in the voltage and current waveshapes.

DETAILED DESCRIPTION OF THE PREFERRED EMBODIMENT

Figure 1:
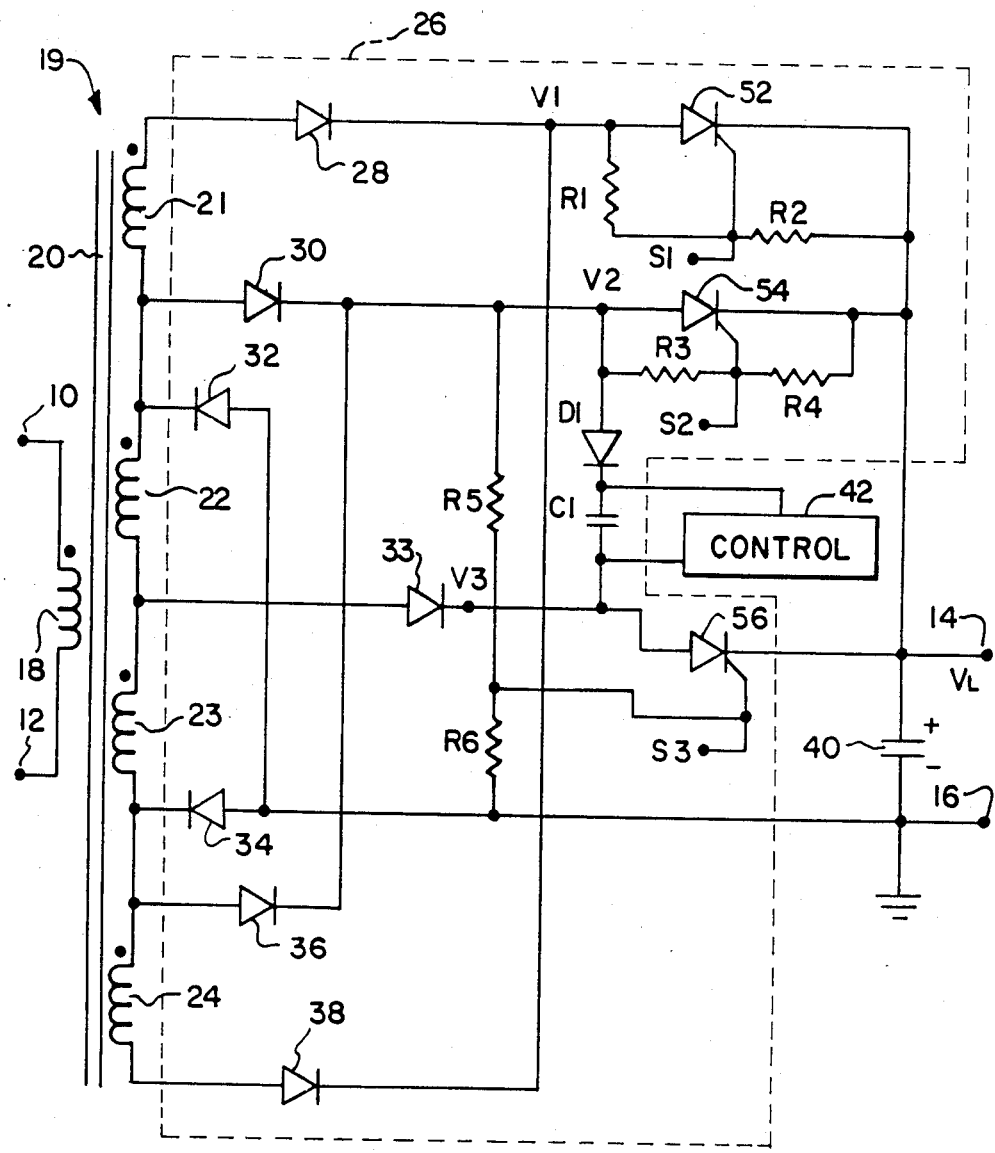
FIG. 1 is an electrical schematic diagram of a rectifier circuit, constructed according to the present invention.

The rectifier circuit according to the present invention is shown in FIGS. 1 and 2, with FIG. 2 being illustrative of the control circuit included in the electrical schematic diagram of FIG. 1. The rectifier circuit receives an A.C. electrical power signal at a pair of circuit input terminals 10 and 12, and provides a rectified, D.C. electrical power signal at a pair of circuit output terminals 14 and 16. A primary transformer winding 18 of transformer 19 is connected to receive the A.C. electrical power signal applied to terminals 10 and 12. The transformer 19 has a core 20 and a plurality of secondary transformer windings 21, 22, 23, and 24. A switch means 26 is provided for connecting a single secondary transformer winding, or the series combination of two or more of the secondary transformer windings, across the output terminals 14 and 16. The switch means 26 includes a rectifier means comprising diodes 28, 30, 32, 33, 34, 36, and 38, which insure a unipolar, D.C. electrical power signal across the output terminals 14 and 16. The rectifier circuit further includes a storage capacitor means 40 which is connected across the output terminals 14 and 16, and which functions to smooth the rectified power signal provided by the circuit.

Figure 3:
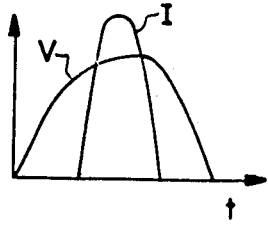
FIG. 3 illustrates the distorted voltage and current waveshapes produced by a typical prior art rectifier circuit.

In operation, the rectifier circuit of the present invention provides many advantages. The typical voltage and current waveforms in the primary of a conventional rectifier circuit are shown in FIG. 3. Such a circuit has its primary winding connected to an A.C. power source and its secondary winding connected to the series combination of a diode and a storage capacitor. The output of the circuit is taken across the storage capacitor. With such a circuit, the diode conducts only during the very short time period of a half cycle in which the secondary winding voltage exceeds the voltage on the storage capacitor. As a consequence, the primary winding and secondary winding currents approximate short duration spikes. Typically, distortion of the A.C. power supply voltage waveshape occurs as a result of the current spikes. It will be appreciated that such distortion in the supply waveshape may cause other equipment connected to the same A.C. power supply system to malfunction. Further, as previously noted, such voltage and current characteristics can, in three phase power systems, produce undesirably high neutral line currents and excessive heat loss in the core of the three phase transformer associated with the system.

Figure 4:
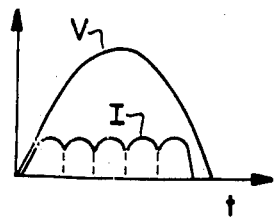
FIG. 4 illustrates the voltage and current waveshapes in the A.C. power signal produced by the device of the present invention.

In order to avoid these problems, the present invention includes a control means 42 for sequentially actuating the switch means such that a single secondary transformer winding and series combinations of the plurality of secondary transformer windings are sequentially connected across the output terminals 14 and 16 during each successive half cycle of the A.C. electrical power signal applied to terminals 10 and 12. By this technique, the charging current supplied to the capacitor 40 and the charging potential across the capacitor 40 fluctuate minimally during most of each half cycle of the A.C. electrical power signal. As a consequence, the primary A.C. electrical power signal at terminals 10 and 12 has voltage and current waveforms approximating those illustrated in FIG. 4.

Note that the voltage waveform is relatively free from distortion and, further, that the current waveshape is such that a lower level of current flows in the primary winding for most of the half cycle of the A.C. power signal. By eliminating the primary current spike, the voltage waveform of the primary is much less distorted. Additionally, the neutral current level in a polyphase power supply system having rectifier circuits according to the present invention connected in the various phases is substantially less than would be the case with conventional rectifier circuits, since the current flow through the separate phases produced by rectifier circuits of the present invention tends to cancel out in the neutral conductor.

The control circuit 42 is illustrated in FIG. 2. The circuit includes a resistor R7 and a zener diode Z1 which provide a reference potential level at node 44. A plurality of comparators 46, 48, and 50 compare the reference potential level to the potential levels across the single transformer winding and a number of series combinations of the plurality of secondary transformer windings. The comparators receive the potentials V1, V2, and V3 from the nodes indicated in FIG. 1, and provide switch signals S1, S2, and S3 which actuate the switch means such that the secondary transformer winding or series combination of windings having the lowest potential thereacross which is in excess of a predetermined level is connected across the output terminals 14 and 16. Specifically, switch signals S1, S2, and S3 are supplied to the control gates of power MOSFET's 52, 54, and 56 to provide appropriate switching during each half cycle of the A.C. power signal. The following chart illustrates the switching sequence during the positive-going half cycle of the A.C. power signal.

| $t_1$ | | | |
|---|---|---|---|
| $V1 < V_z$ Comp 46: off | MOSFET 52: on | $V1 > V_L$ | $I1 = I_L$ |
| $V2 < V_z$ Comp 48: off | MOSFET 54: on | $V2 < V_L$ | $I2 = 0$ |
| $V3 < V_z$ Comp 50: on | MOSFET 56: off | $V3 < V_L$ | $I3 = 0$ |
| $t_2$ | | | |
| $V1 > V_z$ Comp 46: on | MOSFET 52: off | V1 off | $I1 = 0$ |
| $V2 < V_z$ Comp 48: off | MOSFET 54: on | $V2 > V_L$ | $I2 = I_L$ |
| $V3 < V_z$ Comp 50: on | MOSFET 56: off | $V3 < V_L$ | $I3 = 0$ |
| $t_3$ | | | |
| $V1 > V_z$ Comp 46: on | MOSFET 52: off | V1 off | $I1 = 0$ |
| $V2 > V_z$ Comp 48: on | MOSFET 54: off | V2 off | $I2 = 0$ |
| $V3 > V_z$ Comp 50: off | MOSFET 56: on | $V3 > V_L$ | $I3 = I_L$ |
| $t_4$ | | | |
| $V1 > V_z$ Comp 46: on | MOSFET 52: off | V1 off | $I1 = 0$ |
| $V2 < V_z$ Comp 48: off | MOSFET 54: on | $V2 > V_L$ | $I2 = I_L$ |
| $V3 < V_z$ Comp 50: on | MOSFET 56: off | $V3 < V_L$ | $I3 = 0$ |
| $t_5$ | | | |
| $V1 < V_z$ Comp 46: off | MOSFET 52: on | $V1 > V_L$ | $I1 = I_L$ |
| $V2 < V_z$ Comp 48: off | MOSFET 54: on | $V2 < V_L$ | $I2 = 0$ |
| $V3 < V_z$ Comp 50: on | MOSFET 56: off | $V3 < V_L$ | $I3 = 0$ |

Note that $V_z$ is the reference potential level across zener diode Z1; I1 is the current through the series combination of windings 21, 22, and 23; I2 is the current through the series combination of windings 23 and 23; I3 is the current through winding 23 when not connected in series with any of the other windings; and $I_L$ is the charging current to the capacitor 40.

During a positive-going half cycle, as may be seen in FIG. 5, initially the MOSFET 52 is switched on, thus connecting the voltage V1 (the sum of the potentials across secondary windings 21, 22, and 23) across the capacitor 40. When V1 exceeds the voltage previously placed on capacitor 40, diode 28 is forward biased and current I1 is supplied to the capacitor 40. At time t2, the voltage V2 (the voltage across windings 22 and 23) exceeds the voltage on the capacitor 40, with the result that MOSFET 54 is switched on, and MOSFET 52 is switched off. When time t3 is reached, the voltage V3 (the voltage across winding 23) exceeds the voltage on the capacitor 40 and, as a consequence, MOSFET 54 is switched off, and MOSFET 56 is switched on. The charging current I3 is therefore supplied simply from the winding 23. During the second portion of the half cycle, the switching operation is reversed. During the following negative-going half cycle, the circuit operates in the same manner through diodes 33, 36, and 38.

As may be seen, the lowest voltage potential available across the various combinations of secondary windings which exceeds the voltage on the capacitor 40 is applied to the capacitor 40. Further, the charging current supplied to the capacitor 40 is of a much lower amplitude than in the case of the simple prior art systems described previously.

It should also be noted that the current supplied to the capacitor is of a duration substantially equal to the full half cycle of the A.C. power supply. As a consequence, in a multi-phase power supply system, this current will tend to cancel out currents from other phases in the neutral conductor, substantially reducing the amount of current carried by the neutral conductor.

As may be seen in comparing FIGS. 6a and 6b, the A.C. power supply waveform is not distorted to an appreciable degree by the present invention under conditions of either heavy current loading (FIG. 6a) or light current loading (FIG. 6b). In either event, the current waveform is smooth and endures for a substantial portion of each half cycle of the A.C. signal.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A rectifier circuit for receiving a substantially sinusoidal electrical power signal at a pair of circuit input terminals and for providing a rectified, D.C. electrical power signal at a pair of circuit output terminals, comprising:
   a primary transformer winding connected to receive said A.C. electrical power signal,
   a plurality of secondary transformer windings,
   switch means for connecting a single secondary transformer winding or the series combination of two or more of said secondary transformer windings across said output terminals, said switch means including rectifier means to insure a unipolar, D.C. electrical power signal across said output terminals,
   storage capacitor means connected across said output terminals, and
   control means for sequentially actuating said switch means such that a single secondary transformer winding and series combinations of said plurality of secondary transformer windings are sequentially connected across said output terminals during each successive half cycle of said A.C. electrical power signal, whereby the duration of the charging current supplied to said capacitor means during a half cycle of said A.C. electrical power signal is lengthened while limiting the amplitude of the charging current, and the A.C. electrical power signal is not substantially distorted from its sinusoidal waveshape.

2. The rectifier circuit of claim 1 in which said control means comprises:
   reference potential means for providing a reference potential level, and
   a plurality of comparator means for comparing said reference potential level to the potential levels across said single secondary transformer winding and said series combinations of said plurality of secondary transformer windings and for actuating said switch means such that the secondary transformer winding or series combination of windings having the lowest potential thereacross in excess of a predetermined level is connected across said output terminals.

3. The rectifier circuit of claim 2 in which said reference potential level is set such that a generally constant charging current flows to said capacitor during most of each half cycle of said A.C. electrical power signal, whereby the current flow and potential fluctuation in said primary transformer winding are undistorted.

4. The rectifier circuit of claim 1 in which said switch means further comprise a plurality of power MOSFET devices.

5. The rectifier circuit of claim 1 in which said rectifier means includes full wave rectifier means for applying said unipolar D.C. electrical power signal across said output terminals during each half cycle of said A.C. electrical power signal.

6. A rectifier circuit for transforming a substantially sinusoidal A.C. electrical power signal applied to a pair of circuit input terminals into a rectified, D.C. electrical power signal at a pair of circuit output terminals, comprising:
   a primary transformer winding connected to receive said A.C. electrical power signal,
   a plurality of secondary transformer windings,
   a transformer core flux-linking said primary transformer winding and said secondary transformer windings,
   output capacitance means connected between said pair of circuit output terminals,
   switch means for connecting one or more of said secondary transformer windings in series with said output capacitance means so as to effect unipolar charging of said capacitance means, said switch means including rectifier means, and
   control means for sequentially actuating said switch means to connect in sequence during each half cycle of said A.C. electrical power signal a series of combinations of said secondary transformer windings with said output terminals so that a charging voltage, sufficient to forward bias said rectifier means, is applied to said capacitance means during most of each half cycle of said A.C. electrical power signal such that a relatively uniform charging current is supplied to said capacitance means.

7. The rectifier circuit of claim 6 in which said control means includes means for sequentially decreasing the number of secondary transformer windings connected across said output terminals as the absolute value of said A.C. electrical power signal increases and for sequentially increasing the number of secondary transformer windings connected across said output terminals as the absolute value of said A.C. electrical power signal decreases, whereby said rectifier means is forward biased during a substantial portion of each half cycle of said A.C. electrical power signal so that the waveshape of said A.C. electrical power signal is substantially undistorted by said rectifier circuit.

8. The rectifier circuit of claim 6 in which said control means includes
means for monitoring the potential across said combinations of said secondary transformer windings and for actuating said switch means such that only the minimum number of windings necessary to provide a charging voltage in excess of a predetermined level are connected in series with said capacitance means.

9. The rectifier circuit of claim 6 in which said control means comprises a plurality of comparators for comparing the potentials across said combinations of said secondary transformer windings to a reference level.

10. The rectifier circuit of claim 9 in which said switch includes a plurality of power MOSFET devices, responsive to said comparators.

* * * * *